(12) United States Patent
Silver et al.

(10) Patent No.: US 7,333,597 B2
(45) Date of Patent: Feb. 19, 2008

(54) TELEPHONE SYNCHRONIZATION WITH SOFTWARE APPLICATIONS AND DOCUMENTS

(75) Inventors: Edward M. Silver, Atlanta, GA (US); Linda A. Roberts, Decatur, GA (US); Hong T. Nguyen, Atlanta, GA (US)

(73) Assignee: AT&T BLS Intellectual Property, Inc., Wilmington, DE (US)

( * ) Notice: Subject to any disclaimer, the term of this patent is extended or adjusted under 35 U.S.C. 154(b) by 261 days.

(21) Appl. No.: 10/979,464

(22) Filed: Nov. 2, 2004

(65) Prior Publication Data

US 2005/0084085 A1    Apr. 21, 2005

Related U.S. Application Data

(63) Continuation of application No. 10/109,976, filed on Mar. 29, 2002, now Pat. No. 6,873,692.

(51) Int. Cl.
    *H04M 1/56* (2006.01)
    *H04M 15/06* (2006.01)
(52) U.S. Cl. ............ 379/142.17; 379/142.01; 379/142.06; 379/142.15; 379/93.23
(58) Field of Classification Search ......... 379/142.01, 379/142.03, 142.04, 142.06, 142.07, 142.1, 379/142.15, 142.17, 90.01, 93.23, 207.12; 455/415
See application file for complete search history.

(56) References Cited

U.S. PATENT DOCUMENTS

| | | | |
|---|---|---|---|
| 5,546,447 A | 8/1996 | Skarbo et al. | 379/142.05 |
| 5,754,636 A | 5/1998 | Bayless et al. | 379/142.1 |
| 5,832,072 A | 11/1998 | Rozenblit | 379/246 |
| 5,907,604 A | 5/1999 | Hsu | 379/142.06 |
| 5,940,484 A | 8/1999 | DeFazio et al. | 379/142.06 |
| 5,982,867 A | 11/1999 | Urban et al. | 379/201.01 |
| 6,298,128 B1 | 10/2001 | Ramey et al. | 379/142.01 |
| 6,310,944 B1 | 10/2001 | Brisebois et al. | 379/142.01 |

(Continued)

OTHER PUBLICATIONS

U.S. Appl. No. 09/893,910, filed Jun. 29, 2001, entitled "System and Method for Viewing Contents Via a Computer Network During a Telephone Call", Inventors: Silver et al.

*Primary Examiner*—Quoc Tran
(74) *Attorney, Agent, or Firm*—Scott P. Zimmerman, PLLC; Geoff Sutcliffe; Jodi Hartman

(57) ABSTRACT

A method and system are provided for locating and retrieving stored computer files that are related to an incoming telephone call directed to a computer user. A called party receives a telephone call while the called party is operating her computer. A computer telephony interface receives caller identification information on the calling party and uses that information to launch a software synchronization program for locating files stored on the called party's computer that are related to the calling party. A dialog box is displayed on the screen of the called party's computer that provides the caller identification on the calling party and provides an icon for displaying a list of stored files related to the incoming caller. The list of files may be automatically presented to the called party, or the called party may retrieve the list of stored files by selection of the icon presented in the dialog box. Selection of one of the stored files by the called party causes an instance of an application program, such as a word processing program responsible for creation and storage of the selected file, to be launched for displaying the selected file.

20 Claims, 4 Drawing Sheets

U.S. PATENT DOCUMENTS

| | | | |
|---|---|---|---|
| 6,389,124 B1 | 5/2002 | Schnarel et al. | 379/142.01 |
| 6,430,289 B1 | 8/2002 | Liffick | 370/352 |
| 6,459,782 B1 | 10/2002 | Bedrosian et al. | 379/201.08 |
| 6,738,462 B1 | 5/2004 | Brunson | 379/142.06 |
| 6,873,692 B1 * | 3/2005 | Silver et al. | 379/142.17 |
| 7,046,994 B1 * | 5/2006 | Padawer et al. | 455/415 |

* cited by examiner

US 7,333,597 B2

TELEPHONE SYNCHRONIZATION WITH SOFTWARE APPLICATIONS AND DOCUMENTS

CROSS REFERENCE TO RELATED APPLICATION

This application is a continuation of application Ser. No. 10/109,976 filed Mar. 29, 2002 now U.S. Pat. No. 6,873,692.

FIELD OF THE INVENTION

This invention relates to a method and system for linking incoming telephone calls with computer application programs and documents related to the incoming telephone call through a computer telephony interface.

BACKGROUND OF THE INVENTION

Computer users often have a variety of saved documents such as word processing documents, spreadsheet documents, database documents, presentation documents, and the like associated with their work, education, and leisure. For example, a business person may have a variety of letters, spreadsheets, and database files associated with various projects in which the business person is engaged. A student may have homework assignments, reading assignments, or research stored as word processing documents. A home computer user may have their calendar, or social reading stored on their home computer. Often, the various computer generated and stored files maintained by the business person, student, or leisure computer user are related to projects, events and work assignments associated with other persons with which the business person, student or leisure computer user is working or is otherwise engaged. For example, a business person may have a spreadsheet document saved on her office computer that contains accounting data for a work related project on which she is working with another employee of the business.

Often, when the computer user receives a telephone call from a person with whom she is engaged in a project for which she has saved a file on her computer, she must ask the calling party to hold while she locates the saved file and launches the file on her computer so that she may discuss the contents of the file with the calling party.

This process is time consuming and cumbersome because the computer user often must search through a number of stored files to find the appropriate file. If it has been a considerable amount of time since the computer user last processed the file in question, the file may be even more difficult to locate. If the calling party is the computer user's supervisor, or if the calling party is in a rush, the time required to locate and launch the appropriate file is even more bothersome.

Accordingly, there is a need in the art for a method and system for relating an incoming telephone call with computer stored files related to the calling party so that those files may be quickly and easily accessed by the called party. It is with respect to these and other considerations that the present invention has been made.

SUMMARY OF THE INVENTION

In accordance with the present invention, the above and other problems are solved by a method and system for locating and retrieving stored computer files that are related to an incoming telephone call directed to a computer user.

According to the present invention, a called party receives a telephone call while the called party is operating her computer. A computer telephony interface receives caller identification information on the calling party and uses that information to launch a software synchronization program for locating files stored on the called party's computer that are related to the calling party. A dialog box is displayed on the screen of the called party's computer that provides the caller identification on the calling party and provides an icon for displaying a list of stored files related to the incoming caller. The list of files may be automatically presented to the called party, or the called party may retrieve the list of stored files by selection of the icon presented in the dialog box. Selection of one of the stored files by the called party causes an instance of an application program, such as a word processing program responsible for creation and storage of the selected file, to be launched for displaying the selected file.

These and other features and advantages, which characterize the present invention, will be apparent from a reading of the following detailed description and a review of the associated drawings. It is to be understood that both the foregoing general description and the following detailed description are exemplary and explanatory only and are not restrictive of the invention as claimed.

DETAILED DESCRIPTION

The following description of an embodiment of the present invention is made with reference to the above-described drawings wherein like numerals refer to like parts or components through the several figures. The present invention is directed to a method and system for locating and retrieving stored computer files that are related to an incoming telephone call directed to a computer user.

Figure 1:
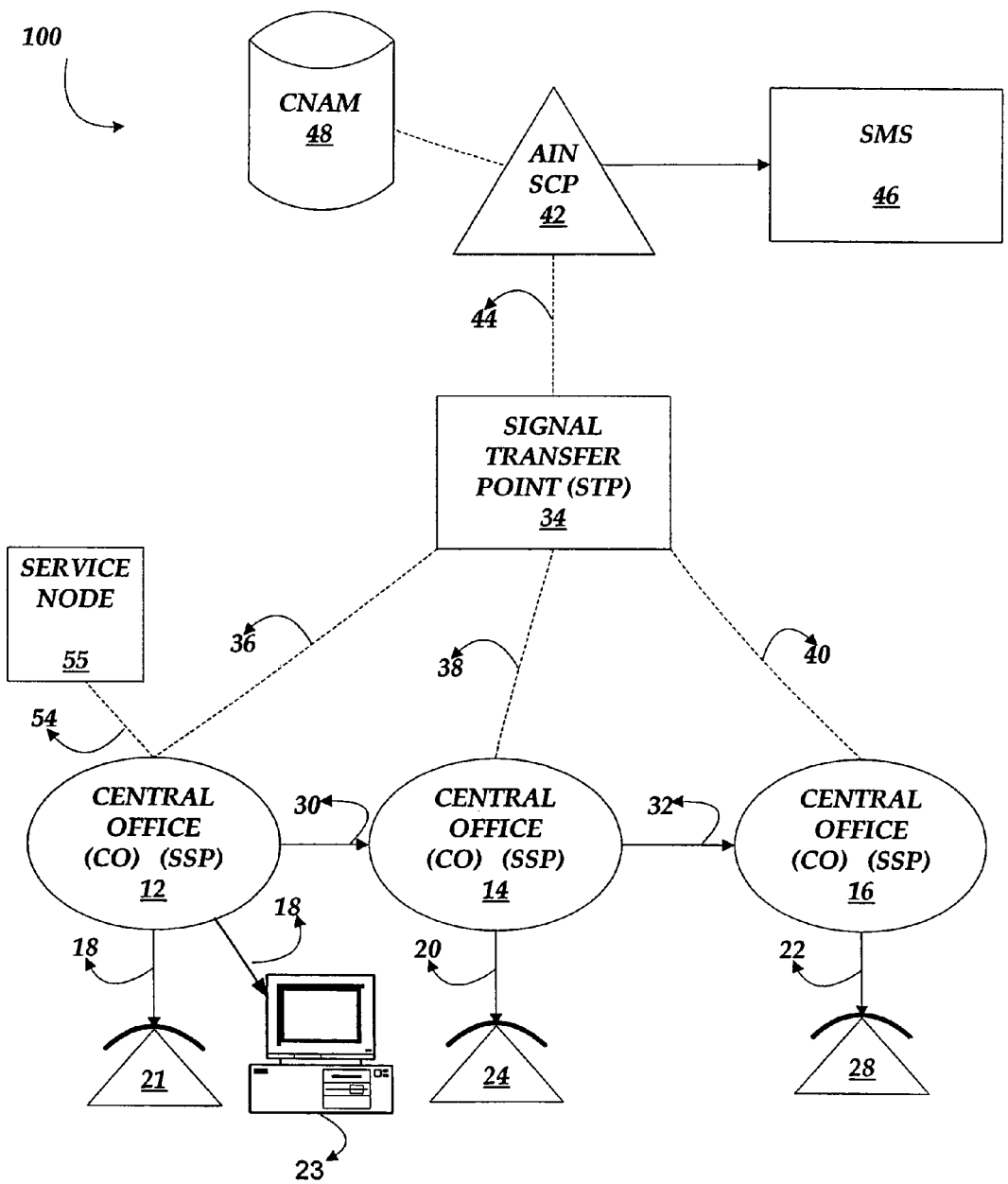
FIG. 1 is a block diagram illustrating components of a telecommunications network that provides an operating environment for the present invention.

FIG. 1 is a block diagram illustrating an exemplary operating environment for an embodiment of the present invention and includes a general description of a modern public switched telephone network through which the present invention preferably operates. The modern public switched telephone network (PSTN) has separate signaling paths for voice signals (or other customer-utilized communication circuits) and for control signals, which include information transmitted throughout the network to control the connection and disconnection of the voice circuits.

The public switched telephone network that evolved in the 1980s also incorporated the advanced intelligent network (AIN). Some of the components of the advanced intelligent network are illustrated in FIG. 1. The advanced intelligent network (AIN) uses the signaling system 7 (SS7) network for signal or system control message transport. The components thereof are well known to those skilled in the art. The operation of many of the components of the advanced intelligent network is also described in U.S. Pat. No. 5,245,719 to Weisser entitled "Mediation of Open Advanced Intelligent Network Interface by Shared Execution Environment" which is incorporated herein by reference. The SS7 communications protocol is provided in the document entitled "Bell Communications Research Specification of Signaling System 7," Document TR-NWT-000246, Issue 2 (June 1991), plus Revision 1 (December 1991), which is also incorporated herein by reference.

Referring still to FIG. 1, a plurality of central offices is provided in a typical public switched telephone network. Each central office may include an electronic switch known to those skilled in the art as a service switching point (SSP). These are indicated in FIG. 1 as SSP switches 12, 14, and 16. The number of SSP switches depends on the number of subscribers to be served by the public switched telephone network. An SSP is the AIN component of a typical electronic central office switch used by a local exchange carrier. The terms "SSP" and "switch" are used interchangeably hereinafter and are understood to refer to a telecommunications switch having AIN capability and which may be utilized for connecting voice channel circuits, including voice channel lines, such as trunk circuits 30 and 32.

Central offices switches (SSP) 12, 14, and 16 have a plurality of subscriber lines 18, 20, and 22 connected thereto. Each of the subscriber lines 18, 20, and 22 is connected to a terminating piece or pieces of customer premises equipment that are represented by telephone sets 21, 24 and 28. SSP switches 12, 14, and 16 are connected by a plurality of trunk circuits indicated as 30 and 32 in FIG. 1. These are the voice path trunks that interconnect the central offices 12, 14, and 16 and over which calls are connected when completed.

Each piece of terminating equipment in the PSTN is preferably assigned a directory number. The term "directory number" is used herein in a manner consistent with its generally understood meaning of a number that is dialed or input by an originating party at an originating station to reach a terminating station associated with the directory number. A directory number, typically a ten digit number, is commonly referred to as a "telephone number" and may be assigned to a specific telephone line, such as the telephone line 18 shown in FIG. 1.

Much of the intelligence, and the basis for many of the enhanced features of the network, resides in the local service control point (SCP) 42 that is connected to signal transfer point 34 via SS7 data link 44. As is known to those skilled in the art, service control points, such as SCP 42, are physically implemented by relatively powerful fault tolerant computers. Among the functions performed by the service control points is maintenance of network databases used in providing enhanced services. The SCP 42 is also connected to a caller ID with name (CNAM) database 48. The CNAM database comprises a plurality of directory numbers along with associated names for the directory numbers. The CNAM database may be used to provide a look-up database to provide caller identification (ID) service.

In operation, the intelligent network elements of the telecommunications network 100, as described above, communicate with each other via digital data messages transmitted over the network of digital data links. An SSP may be configured to interface with these network elements through the use of a trigger. A trigger in the network is an event associated with a particular subscriber line or call that causes the SSP to generate a data packet message to be sent to a service control point. In order to keep the processing of data and calls as simple and generic as possible at central office switches, such as SSP central office switches 12, 14, and 16, a relatively small set of triggers are defined at the SSP central office switches for each call.

The message created by an SSP 12 in response to a trigger is known as a "query" message. A query message opens a "transaction" and the SSP generally holds the communication until it receives a reply from an appropriate network element via the network of digital data links instructing the SSP 12 to take a certain action. If the SSP 12 receives no instructions within a certain amount of time, the SSP "times-out" and executes a default task for the communication. The reply to the query message may be a "conversation" message or a "response" message. Conversation messages allow for bi-directional exchanges between network elements while the transaction remains open. A "response" message closes the transaction opened by the query message, and usually instructs the SSP 12 to route the held communication for connection with a terminating station. Query messages, conversation messages, and response messages are standard types of messages defined by the AIN protocol. The details of the AIN protocol are known to those skilled in the art and will not be further described herein. For more information regarding the AIN protocol, see Bellcore Specification GR-1298-CORE Switching Systems Generic Requirements for AIN 0.1, which is incorporated herein by reference.

The modern Advanced Intelligent Network also includes service nodes (SN) such as service node 55 shown in FIG. 1. Those skilled in the art are familiar with service nodes, which are physically implemented by the same types of computers that embody the SCP 42. In addition to the computing capability and data base maintenance features, service nodes 55 use ISDN lines and may include DTMF signal recognition devices, tone generation devices, text to speech (TTS) voice synthesis devices and other voice or data resources. As shown in FIG. 1, the connection is through the SSP. For example SN 55 is connected to SCP 42 via ISDN links 54 to SSP 12, ISDN/SS7 protocol conversion in SSP 12, and SS7 links 36 and 44. It is understood that the service node 55 may also be connected to a service management system 46, but such connection is not shown in FIG. 1. Service nodes 55 are used principally when some custom feature or service is needed that requires an audio connection to the call or transfer of a significant amount of data to a subscriber over a switched connection during or following a call.

The computer 23 illustrated in FIG. 1 represents any well known computing device capable of processing information that may be stored and subsequently retrieved by the computer user. The computer 23 may be operated on the same subscriber line 18 as the telephone 21 of the computer user such as often the case in a home computing or small business computing environment. The subscriber line 18 connected to the computer 23 may be a standard analog subscriber line or may include other lines for transmitting data to and from the computer 23 such as a digital subscriber line or T1 line. Alternatively, the computer 23 may be part of a distributed computing environment in a large business or educational institution where data is transmitted to and from the computer 23 in accordance with the present invention from a telecommunications network 100 that is connected to the distributed computing environment or network in which the computer 23 resides. Likewise, data and files saved on the computer 23 may be saved on and retrieved from a remote memory server connected to the computer 23 via a distributed computing environment.

Figure 2:
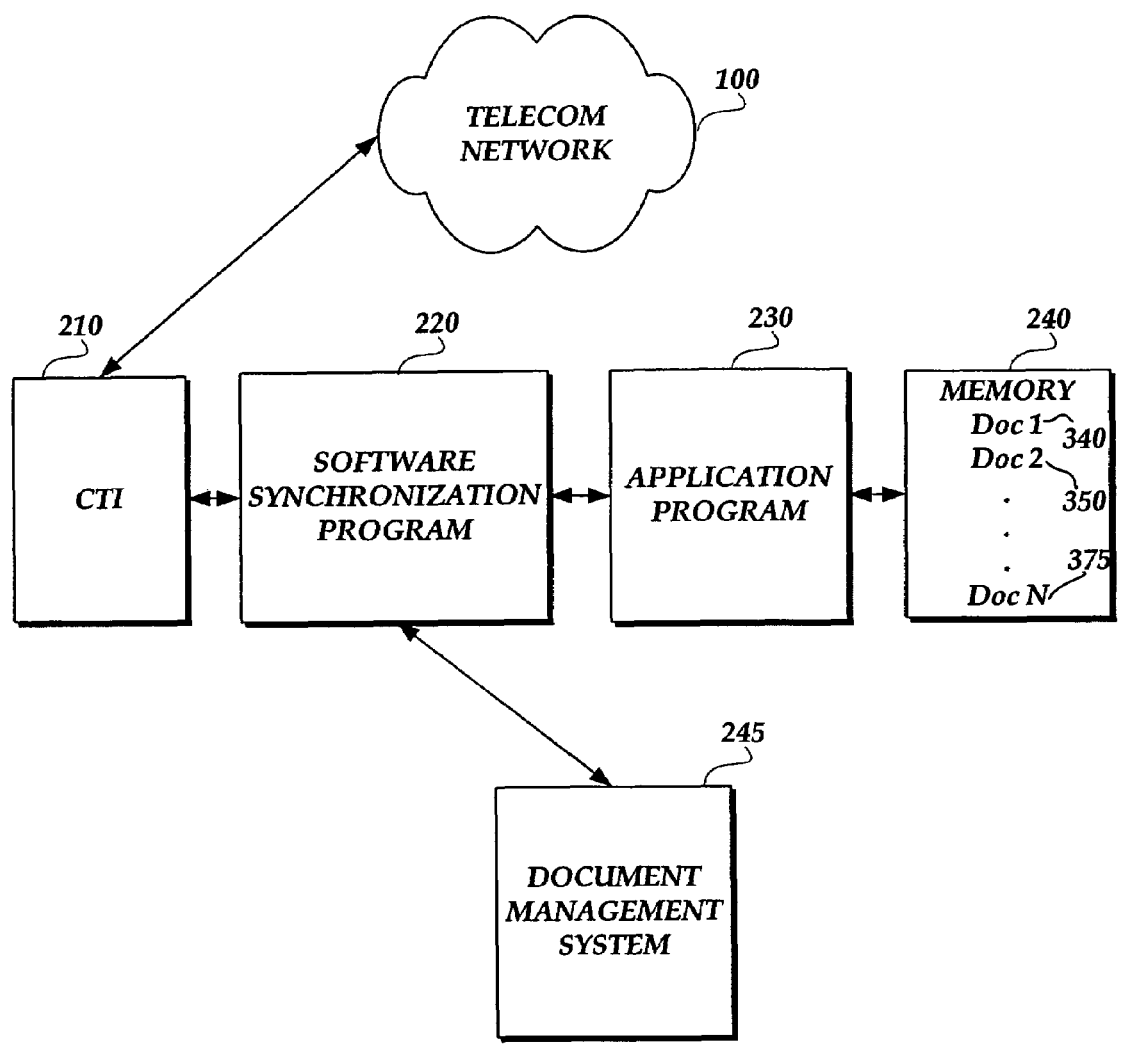
FIG. 2 is a simplified block diagram illustrating interaction between a telephone network, a computer telephony interface, a software synchronization program, an application program, a document management system, and a set of stored documents in accordance with the present invention.

Referring now to FIG. 2, in accordance with the present invention, incoming calls directed to the operator of a telephone 21 and computer 23 are received at the telephone 21 along with caller identification information obtained on the calling party. As should be understood by those skilled in the art, when the calling party initiates a telephone call to the called party from the calling party's telephone 24, an intelligent network component such as the service control point 42 obtains caller identification information such as the caller's name, telephone, and address from the CNAM database 48 for presentation to the called party at the called party's telephone 21. Operation of caller identification systems is well known to those skilled in the art.

A computer telephony interface 210 serves as an interface between the called party's telephone 21 and the called party's computer 23. Computer telephone integration, as facilitated by the computer telephony interface (CTI) 210, is a process for integration of a telephone system with a computing system. For example, the CTI 210 may be used for allowing computer applications to answer incoming calls, provide database information on a computer screen at the same time the call comes in, automatically route and reroute calls, automatically dial and speed dial outgoing calls from a computer resident database and identify incoming customer calls and transfer them to predetermined destinations based on caller identification received on the incoming telephone call. According to the present invention, the CTI 210 serves as an interface between the called party's telephone 21 and the called party's computer 23 for linking computer files saved on the called party's computer 23 to the incoming telephone call based on caller identification information received on the incoming telephone call.

The computer telephony interface 210 may be a software application program resident on the called party telephone 21 for passing information such as the caller identification information on a calling party to the called party computer 23. Alternatively, the computer telephony interface 210 may also include a software application program resident on the called party computer 23 for receiving and acting upon information received from the called party telephone 21 such as the caller identification information on a calling party.

The software synchronization program 220 is a computer software application according to the present invention resident on the called party computer 23 for linking stored computer files to caller identification information received through the CTI 210 on an incoming telephone call. The software synchronization program 220 may include an application programming interface (API) which as is known to those skilled in the art is a set of routines used by an application program to direct the performance of procedures by the computer's operating system. In accordance with the present invention, the procedures performed by the program 220 include searching for the file paths to stored computer files that are associated with an incoming telephone call based on caller identification information for the incoming telephone call. Additionally, the software synchronization program 220 launches a dialog box, discussed with reference to FIG. 3, for providing the called party access to all stored computer files related to the incoming call. Accordingly, the software synchronization program 220 serves as an intermediary application between the CTI 210 and stored computer files related to an incoming telephone call.

The application program 230 is illustrative of any software application program for creating and storing files in accordance with the present invention. For example, the application program 230 may be a word processing program, a spreadsheet program, a database program, a desktop publishing program, and the like. The application program 230 is limited only by the numbers and types of software application programs loaded and operated on the called party's computer 23 for creating, storing, and operating on computer files.

The memory 240 is illustrative of memory containing stored computer documents that may be accessed, retrieved, and displayed in accordance with the present invention. For example, the documents 340, 350, 370 may include word processing documents, spreadsheet documents, database documents, and the like. The memory 240 may be resident on the computer 23 or may be resident on a remote storage device such as a remote memory server that may be accessed by the computer 23 via a distributed computing environment.

In order for the software synchronization program 220 to locate stored computer files 340, 350, 375 for presentation to the called party in accordance with the present invention, the stored files must include information that allows the software synchronization program 220 to locate those files in relation to caller identification information received on an incoming telephone call. The document management system 245 is illustrative of a software program or application programming interface for collecting information related to a given computer file and linking that information to the computer file for subsequent searching and retrieval of the file based on that collected information. For example, in accordance with a variety of well known document management systems, when a user of the computer 23 saves any computer file 340, 350, 375, the computer user is presented with a dialog box that requires the input of certain identification information for the file before the file is saved. For example, upon selection of the save functionality of the application program 230, such as a word processing program, the user of the computer 23 may be presented with a dialog box that requests such information as a name for the file to be saved, a name or title associated with the file, or other information that may be used to locate the file during a subsequent search.

In accordance with the present invention, the document management system 245 in conjunction with the application program 230 allows the user to save information including the name of a party related to the stored file, the telephone number of a party associated with the stored file, the address of a party associated with the stored file, or any other pertinent personal or related information. For example, if the user has prepared a spreadsheet of accounting data for a project on which she is working with a fellow employee, when the user saves the spreadsheet file with the software application program 230, the document management 245 allows the computer user to store the name of the fellow employee, the fellow employee's telephone number, the fellow employee's address, and any other information, such as the employee's job title, wireless telephone number, and the like.

According to the present invention, when an incoming telephone call is received by the called party on the called party's telephone 21, caller identification information received on the calling party, as described above, is used by the software synchronization program to search for computer files based on the caller identification information so received. That is, the software synchronization program searches on caller identification information such as the caller's name, telephone number, and address. Based on the search of the memory 240 by the software synchronization program 220, all computer files 340, 350, and 375, with stored identification information matching caller identification information received on the calling party allows the software synchronization program to flag those files for presentation to the called party in response to the incoming telephone call.

Figure 3:
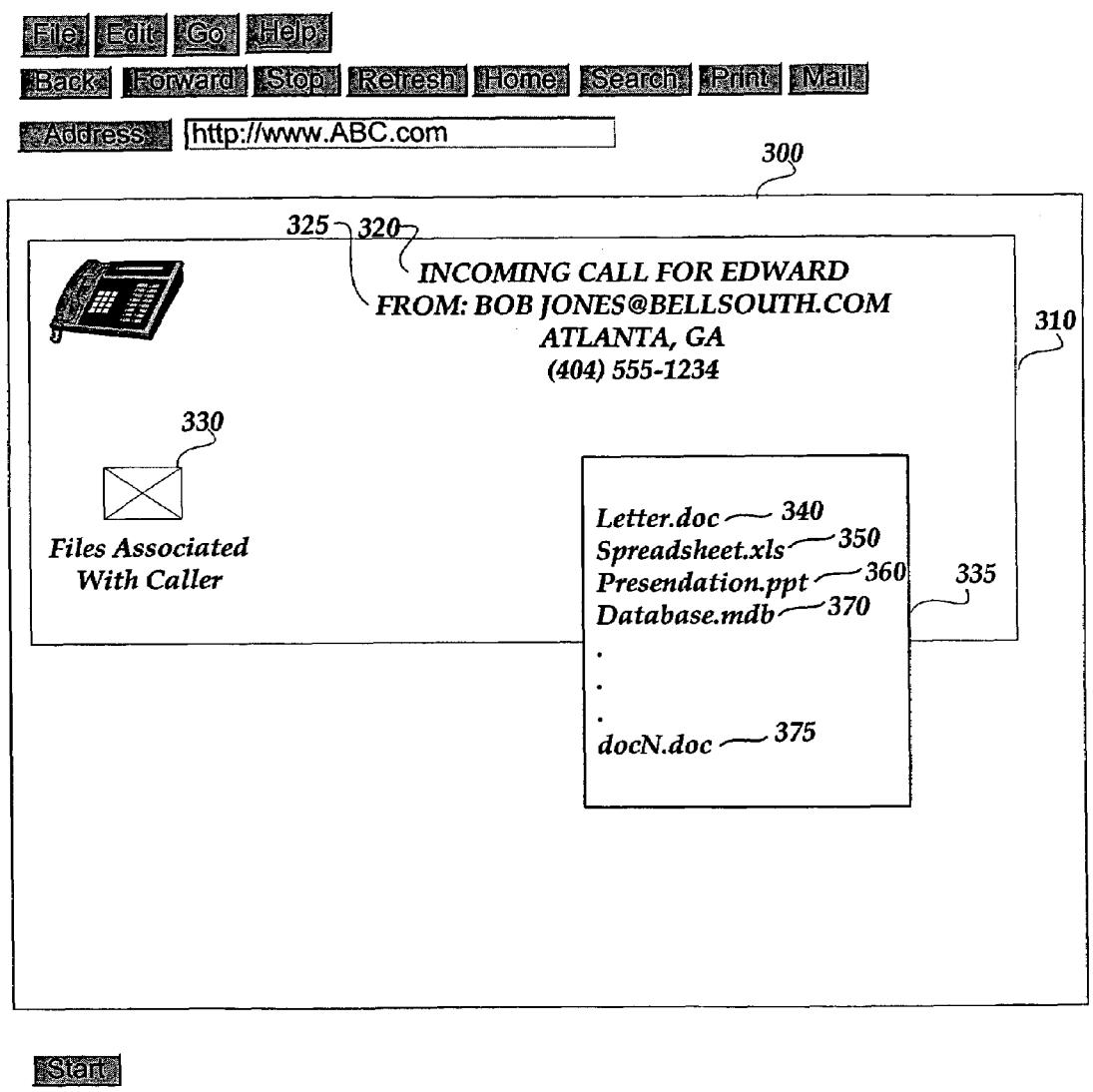
FIG. 3 illustrates a computer screen display showing a user interface for linking an incoming telephone call to stored computer files related to the incoming telephone call according to the present invention.

Referring now to FIG. 3, a graphical user interface 310 for presentation of caller identification information on an incoming call and for providing the called party access to computer files related to the incoming call is illustrated. When an incoming telephone call is received and information on that call such as caller identification information is passed to the called party's computer 23 via the CTI 210, the software synchronization program 220 launches the graphical user interface 310 on the display screen 300 of the computer 23. The caller identification information 325 including any information included in the caller identification data such as the telephone number, address, e-mail address, work address, etc. for the incoming telephone call is displayed. Prior to launching the user interface dialog box 310, the software synchronization program searches for all files 340, 350, 360, 370, 375, associated with the incoming call, as described above with reference to FIG. 2.

Once the software synchronization program establishes a file path to each of the stored files related to the incoming call, the dialog box 310 is displayed to the called party so that the called party may access the related files. An icon 330 is illustrated in FIG. 3 for presentation of all files related to the incoming telephone call located by the software synchronization program, as described above. Selection of the icon 330 launches a display box 335 that displays each of the related files. As shown in FIG. 3, a letter document 340, a spreadsheet document 350, a presentation document 360, and a database document 370 are illustrated as documents located and presented to the called party as related to the incoming telephone call. Alternatively, the display box 335 may be presented to the called party automatically without selection of the icon 330. As should be understood by those skilled in the art, the presentation of the files 340-375 may be done according to a number of display protocols such as alphabetical ordering or ordering based on the date of document modification.

Figure 4:
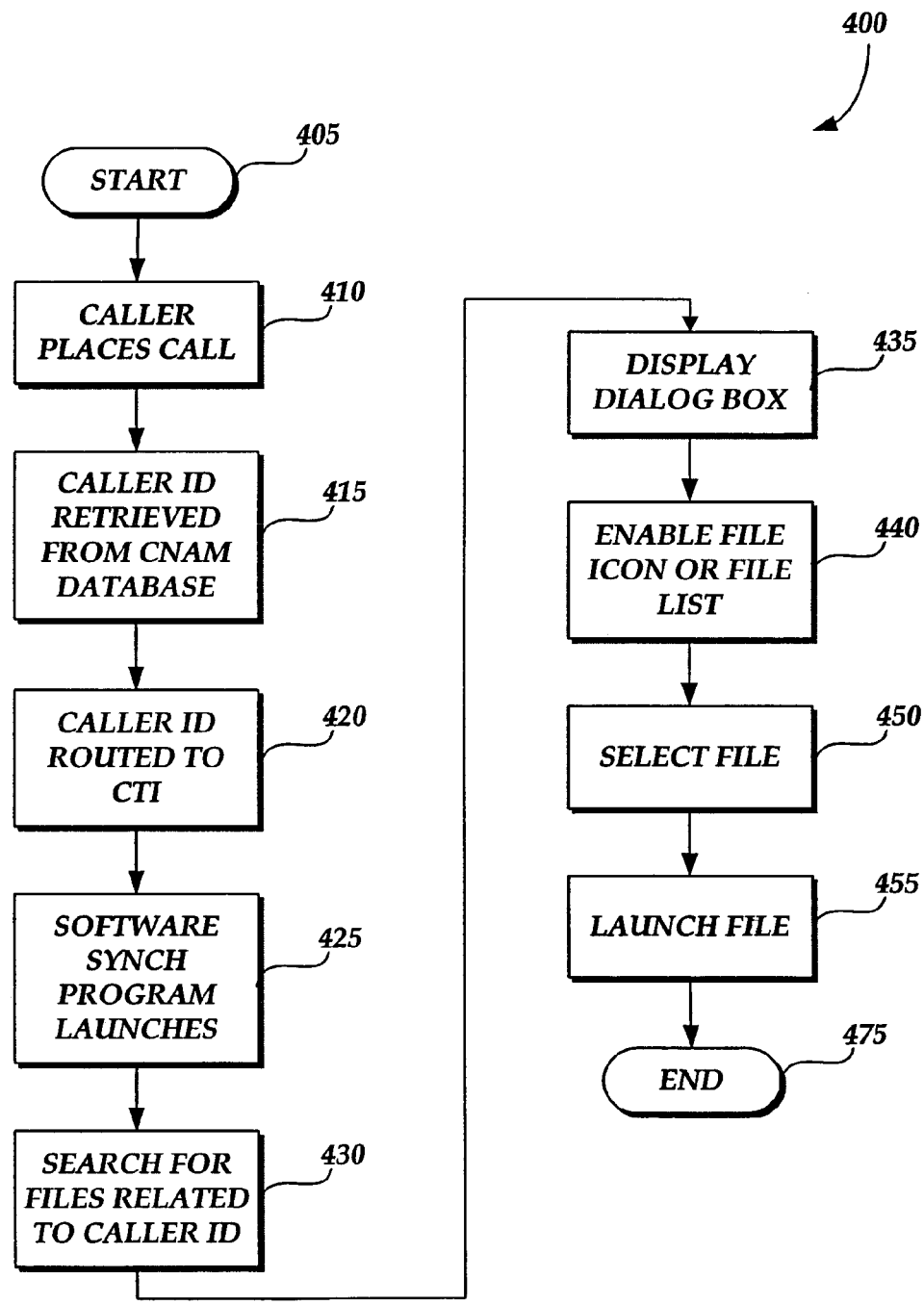
FIG. 4 illustrates a logical call flow of steps performed by a method and system of the present invention for linking and retrieving stored computer files related to an incoming telephone call according to an embodiment of the present invention.

Referring now to FIG. 4, the following is a description of an exemplary operation of an embodiment of the present invention with reference to FIGS. 1-4. FIG. 4 illustrates a logical call flow of steps performed by a method and system of the present invention for lining and retrieving stored computer files related to an incoming telephone call.

The method 400 begins at start step 405 and proceeds to step 410 where a calling party places a telephone call from the calling party's telephone 24 to the called party at the called party's telephone 21. At step 415, a query is generated from the central office SSP 14 of the calling party to the service control point 42 for obtaining caller identification information on the calling party from the CNAM database 48.

At step 420, the telephone call from the calling party along with the caller identification information retrieved from the CNAM database 48 is routed to the called party at the called party's telephone 21 through the called party's central office SSP 12 in accordance with standard call routing procedures. According to the present invention, the computer telephony interface 210 recognizes the caller identification information and routes the caller identification information to the software synchronization program resident on the called party's computer 23.

At step 425, in response to receipt of the caller identification information on the incoming call, the CTI 210 launches the software synchronization program 220 for searching and retrieving stored computer files related to the incoming telephone call. At step 430, the software synchronization program searches the memory 240 of the computer 23 for computer files related to the incoming telephone call based on the caller identification information associated with the incoming telephone call. As described above with reference to FIG. 2, the software synchronization program locates related computer files based on previously input information related to the incoming telephone call such as the caller's name, telephone number or address. Once the software synchronization program 220 locates all computer files related to the incoming telephone call, the dialog box 310 is launched on the display screen 300 of the computer 23 at step 435. As shown in FIG. 3, according to a preferred embodiment, caller identification information for the incoming telephone call is presented in the dialog box to the user of the computer 23.

At step 440, based on the files located by the software synchronization program 220, the icon 330 is enabled and is displayed to the user of the computer 23 in the dialog box 310. As described above, selection of the icon 330 causes the display box 335 to be presented to the user of the computer 23 for presentation of a list of all files located by the software synchronization program 220 that are related to the incoming telephone call based on the caller identification information for the incoming telephone call. Alternatively, as described above, the display box 335 may be presented to the user of the computer 23 automatically without selection of the icon 330.

At step 450, the called party may view the list of documents found by the software synchronization program and select a document that the called party determines is most likely the document the calling party is calling to discuss. Or, the calling party may wait until the calling party tells the called party the precise document the calling party would like to discuss. For example, if the calling party recognizes from the caller identification information 325 that the calling party is a co-worker with whom the called party has very recently constructed the spreadsheet document 350 displayed in the display box 335, the called party may select the spreadsheet document 350 at step 450.

At step 455, selection of the stored computer file, such as the spreadsheet document 350, launches an instance of the application program 230 responsible for creation and storage of the selected file, and the selected file, such as the spreadsheet document 350 is displayed to the called party on the computer screen 300 of the called party's computer 23. Advantageously, the called party quickly and efficiently locates and launches the selected computer file related to the incoming call without having to place the caller on hold or cause the caller to wait while the called party searches for a selected file through a large list of stored files on the called party's computer 23.

It will be apparent to those skilled in the art that various modifications or variations may be made in the present invention without departing from the scope or spirit of the invention. Other embodiments of the invention will be apparent to those skilled in the art from consideration of the specification and practice of the invention disclosed herein.

We claim:

1. A method for locating and providing access to stored computer files relating to an incoming telephone call, comprising:
   receiving caller identification information at a called party's computer;
   upon receipt of the incoming call, searching the called party's computer to identify all files with stored identification information matching the received caller identification information; and
   causing presentation of a notification that informs the called party of the incoming call, the notification comprising the caller identification information and a list of all the files related to the caller identification information.

2. The method of claim 1, wherein searching the called party's computer comprises searching for at least one of word processing files and spreadsheet files that are linked to the caller identification information.

3. The method of claim 1, prior to searching the called party computer, associating a file to the caller identification information.

4. The method of claim 1, wherein causing presentation of the notification comprises causing display of a dialog box.

5. The method of claim 1, further comprising receiving a selection of a tile from the list of files presented to the called party.

6. The method of claim 5, further comprising launching an application program on the called party's computer that displays the selected file.

7. The method of claim 1, further comprising launching an application program that processes a file from the list of files.

8. The method of claim 1, wherein receiving the caller identification information comprises receiving the caller identification information from a caller name database having caller identification information on calling parties.

9. The method of claim 1, wherein prior to searching the called party's computer, further comprising:
   launching a software synchronization program; and
   routing the caller identification information to the software synchronization program for searching for and locating data indicating that the files are related to the caller identification information.

10. The method of claim 9, further comprising:
    establishing a file path to the files related to the caller identification information.

11. A system for locating and providing access to stored computer files relating to an incoming telephone call, comprising:
    a called party computer operative to
       receive caller identification information via a computer telephony interface; and
    a software synchronization program operative
       upon receipt of the incoming call, to search the called party's computer to identify at least one of word processing files and spreadsheet files that are related to the caller identification information; and
       to cause presentation of a notification that informs the called party of the incoming call, the notification comprising the caller identification information and a list of all the files related to the caller identification information.

12. The system of claim 11, further comprising
    a document management system operative to save data with the files indicating that the files are related to the caller identification information.

13. The system of claim 11, the software synchronization program being further operative to establish a file path to the files related to the caller identification information.

14. A method for locating and providing access to stored computer files relating to an incoming telephone call, comprising:
    receiving caller identification information at a called party's computer via a computer telephony interface;
    saving data with the files indicating that the files are related to the caller identification information;
    upon receipt of the incoming call, searching the called party's computer for all files with stored data indicating that the files are related to the caller identification information; and
    causing presentation of a notification that informs the called party of the incoming call, the notification comprising the caller identification information and a list of all the files containing data indicating that the file is related to the caller identification information.

15. The method of claim 14, further comprising:
    receiving a selection of a file from the list of the flies presented to the called party; and
    launching an application program on the called party's computer that causes display of the selected file.

16. The method of claim 14, wherein receiving the caller identification information comprises receiving the caller identification information from a caller name database having caller identification information on calling parties.

17. The method of claim 14, wherein prior to searching the called party's computer, further comprising:
    launching a software synchronization program; and
    routing the caller identification information to the software synchronization program for searching for and locating data indicating that the files are related to the caller identification information.

18. A computer readable medium having stored thereon computer-executable instructions for causing a computer to perform the method of claim 1.

19. A computer readable medium having stored thereon computer-executable instructions for causing a computer to perform the method of claim 14.

20. The method of claim 1, wherein receiving the caller identification information comprises receiving the caller identification information via a computer telephony interface.

* * * * *